US012354778B2

(12) United States Patent
Watanabe et al.

(10) Patent No.: US 12,354,778 B2
(45) Date of Patent: Jul. 8, 2025

(54) GRAIN-ORIENTED ELECTRICAL STEEL SHEET AND METHOD FOR PRODUCING SAME

(71) Applicant: JFE Steel Corporation, Tokyo (JP)

(72) Inventors: Makoto Watanabe, Tokyo (JP); Masahiro Suemune, Tokyo (JP); Takeshi Imamura, Tokyo (JP)

(73) Assignee: JFE Steel Corporation, Tokyo (JP)

( * ) Notice: Subject to any disclaimer, the term of this patent is extended or adjusted under 35 U.S.C. 154(b) by 0 days.

(21) Appl. No.: 17/768,570

(22) PCT Filed: Oct. 27, 2020

(86) PCT No.: PCT/JP2020/040278
§ 371 (c)(1),
(2) Date: Apr. 13, 2022

(87) PCT Pub. No.: WO2021/085421
PCT Pub. Date: May 6, 2021

(65) Prior Publication Data
US 2024/0105369 A1 Mar. 28, 2024

(30) Foreign Application Priority Data

Oct. 31, 2019 (JP) .................. 2019-198947

(51) Int. Cl.
*H01F 1/147* (2006.01)
*C21D 1/74* (2006.01)
(Continued)

(52) U.S. Cl.
CPC .......... *H01F 1/14783* (2013.01); *C21D 1/74* (2013.01); *C21D 6/001* (2013.01); *C21D 6/002* (2013.01);
(Continued)

(58) Field of Classification Search
None
See application file for complete search history.

(56) References Cited

U.S. PATENT DOCUMENTS

| 4,127,429 | A |   | 11/1978 | Ichida et al. |
| 4,897,131 | A | * | 1/1990 | Wada .................. C21D 8/1277 148/307 |

(Continued)

FOREIGN PATENT DOCUMENTS

| CN | 106661658 A | 5/2017 |
| CN | 107406936 A | 11/2017 |

(Continued)

OTHER PUBLICATIONS

Chinese Office Action for Chinese Application No. 202080069263.1, with English Search Report, dated Feb. 16, 2023, 13 pages.

(Continued)

*Primary Examiner* — Kim S. Horger
(74) *Attorney, Agent, or Firm* — Buchanan Ingersoll & Rooney PC (57) ABSTRACT

In a production of a grain-oriented electrical steel sheet comprising hot rolling a raw steel material, cold rolling, decarburization annealing, applying an annealing separator composed mainly of MgO, finish annealing and magnetic domain subdividing, the annealing separator including certain compounds, and the finish annealing conducted by holding the steel sheet at a temperature of 800 to 950° C. for 10 to 100 hours and passing a dry gas containing not less than 1 vol % of $H_2$ and having a dew point of not higher than 10° C. to reach a furnace pressure of not less than 3.5 mmH$_2$O from not lower than 1050° C. to a purification treatment temperature, so that a pickling weight loss of undercoat film by pickling with HCl is not more than 1.8 g/m$^2$ and the total concentration of Sn, Sb, Mo, and W on a (Continued)

boundary face between the film and iron matrix is 0.01 to 0.15 mass %.

11 Claims, 4 Drawing Sheets

(51) Int. Cl.

| | |
|---|---|
| *C21D 6/00* | (2006.01) |
| *C21D 8/12* | (2006.01) |
| *C21D 9/46* | (2006.01) |
| *C22C 38/00* | (2006.01) |
| *C22C 38/02* | (2006.01) |
| *C22C 38/04* | (2006.01) |
| *C22C 38/06* | (2006.01) |
| *C22C 38/08* | (2006.01) |
| *C22C 38/12* | (2006.01) |
| *C22C 38/14* | (2006.01) |
| *C22C 38/16* | (2006.01) |
| *C22C 38/20* | (2006.01) |
| *C22C 38/34* | (2006.01) |
| *C22C 38/40* | (2006.01) |
| *C22C 38/60* | (2006.01) |
| *C23G 1/08* | (2006.01) |

(52) U.S. Cl.
CPC ............. *C21D 6/004* (2013.01); *C21D 6/005* (2013.01); *C21D 6/008* (2013.01); *C21D 8/1222* (2013.01); *C21D 8/1233* (2013.01); *C21D 8/1255* (2013.01); *C21D 8/1261* (2013.01); *C21D 8/1266* (2013.01); *C21D 8/1283* (2013.01); *C21D 9/46* (2013.01); *C22C 38/001* (2013.01); *C22C 38/002* (2013.01); *C22C 38/008* (2013.01); *C22C 38/02* (2013.01); *C22C 38/04* (2013.01); *C22C 38/06* (2013.01); *C22C 38/08* (2013.01); *C22C 38/12* (2013.01); *C22C 38/14* (2013.01); *C22C 38/16* (2013.01); *C22C 38/20* (2013.01); *C22C 38/34* (2013.01); *C22C 38/40* (2013.01); *C22C 38/60* (2013.01); *C23G 1/08* (2013.01); *C22C 2202/02* (2013.01)

(56) References Cited

U.S. PATENT DOCUMENTS

| | | | |
|---|---|---|---|
| 5,725,681 A * | 3/1998 | Ishitobi ................ | C21D 8/1255 148/113 |
| 2002/0000265 A1* | 1/2002 | Toda ..................... | C22C 38/002 148/307 |
| 2010/0122712 A1* | 5/2010 | Madi ..................... | C23G 3/021 134/3 |
| 2013/0228251 A1 | 9/2013 | Shingaki et al. | |
| 2017/0152580 A1 | 6/2017 | Kimura et al. | |
| 2018/0066346 A1 | 3/2018 | Imamura et al. | |
| 2018/0171425 A1 | 6/2018 | Shingaki et al. | |
| 2019/0017139 A1 | 1/2019 | Omura et al. | |
| 2019/0228891 A1 | 7/2019 | Natori et al. | |
| 2021/0017619 A1* | 1/2021 | Morishige ................ | C23G 1/08 |

FOREIGN PATENT DOCUMENTS

| | | |
|---|---|---|
| CN | 109563583 A | 4/2019 |
| EP | 0416420 A2 | 3/1991 |
| JP | 50134917 A | 10/1975 |
| JP | 535800 U | 1/1978 |
| JP | 02125815 A | 5/1990 |
| JP | 10121143 A | 5/1998 |
| JP | 2000239736 A | 9/2000 |
| JP | 2001295062 A | 10/2001 |
| JP | 4258202 B2 | 4/2009 |
| JP | 2012052232 A | 3/2012 |
| JP | 2012177162 A | 9/2012 |
| JP | 2017166016 A | 9/2017 |
| WO | WO-2019181952 A1 * | 9/2019 ............... C21D 1/26 |

OTHER PUBLICATIONS

International Search Report and Written Opinion for International Application No. PCT/JP2020/040278, dated Jan. 26, 2021, 7 pages.
Canadian Examination Report for Canadian Application No. 3,152,615, dated Jan. 13, 2023, 3 pages.
Japanese Office Action for Japanese Application No. 2021-511685, issued Apr. 12, 2022, with Concise Statement of Relevance of Office Action, 6 pages.
Extended European Search Report for European Application No. 20880561.4, dated Sep. 29, 2022, 9 pages.

* cited by examiner

GRAIN-ORIENTED ELECTRICAL STEEL SHEET AND METHOD FOR PRODUCING SAME

CROSS REFERENCE TO RELATED APPLICATIONS

This is the U.S. National Phase application of PCT/JP2020/040278, filed Oct. 27, 2020, which claims priority to Japanese Patent Application No. 2019-198947, filed Oct. 31, 2019, the disclosures of these applications being incorporated herein by reference in their entireties for all purposes.

FIELD OF THE INVENTION

This invention relates to a grain-oriented electrical steel sheet and a method for producing the same, and more specifically, to a grain-oriented electrical steel sheet having excellent magnetic properties and film properties and being suitable for a magnetic domain subdividing treatment and a method for producing the same.

BACKGROUND OF THE INVENTION

Grain-oriented electrical steel sheets are mainly used as an iron core material for a transformer and thus strongly demanded to have excellent magnetic properties, particularly a low iron loss. Such a grain-oriented electrical steel sheet has been produced by subjecting a cold-rolled Si-containing steel sheet to decarburization annealing combined with primary recrystallization annealing, applying an annealing separator composed mainly of MgO thereto, and causing secondary recrystallization in finish annealing to highly align crystal grains into {110}<001> orientation (so-called Goss orientation). The finish annealing takes about 10 days involving annealing for causing secondary recrystallization and a purification treatment for removing impurities by heating the steel sheet to about 1200° C., and is usually performed by batch annealing (box annealing) at a state of winding into a coil.

In the finish annealing, a subscale composed mainly of $SiO_2$ formed on the surface layer portion of the steel sheet during the decarburization annealing and the annealing separator composed mainly of MgO applied onto the steel sheet surface after the decarburization annealing cause a reaction expressed by the following formula:

$$2MgO + SiO_2 \rightarrow Mg_2SiO_4,$$

thus to form a forsterite film on the steel sheet surface. Since the forsterite film has an effect of not only imparting insulation properties and corrosion resistance to a product sheet but also tensile stress to the steel sheet surface to thus improve magnetic properties, it is required to be uniform and have excellent adhesiveness. Note that the forsterite film is also called hereinafter as "undercoat film" or "film" simply.

In recent years, grain-oriented electrical steel sheets have been demanded to have more improved iron loss properties, against a background of demands for energy saving. To this end, development has been made on a technique for reducing iron loss by achieving magnetic domain subdividing by irradiating laser beams, electron beams, plasma flame or the like to the steel sheet that has completed finish annealing or further coated with an insulation film to thus locally apply heat strain. However, the local heating at a high energy density may possibly cause the film to be locally stripped due to the heat strain. Such a stripped portion of the film, when being present, deteriorates corrosion resistance and insulation properties and requires the insulation film to be applied and baked again, thus leading to a cost increase. It also causes a problem that the local heat strain that has been applied once is released to lose the effect of the magnetic domain subdividing.

Various methods have been proposed to solve such a problem. For example, Patent Literature 1 proposes a method in which the presence ratio of a Se concentrated portion that has been formed on a boundary face between a film and iron matrix is controlled to a given level by an area ratio, and then an electron beam is irradiated. Patent Literature 2 proposes a method of performing magnetic domain subdividing treatment by irradiating electron beams on the surface of a grain-oriented electrical steel sheet subjected to finish annealing after heating the steel sheet to not lower than 50° C. Patent Literature 3 proposes a method of repeatedly increasing and decreasing the furnace pressure in the temperature range of 600 to 1150° C. of the furnace atmosphere during heating in finish annealing. Patent Literature 4 proposes a method in which, in flattening annealing, each condition of the soaking temperature in annealing, cooling rate from the soaking temperature, and plastic elongation amount of the steel sheet is adjusted to control decreasing amount in the tension of the forsterite film before and after the flattening annealing to not more than 60% and further adding compounds of Sn, Sb, Mo and W to an annealing separator to include these metals in the iron matrix.

PATENT LITERATURES

Patent Literature 1: JP-A-2012-052232
Patent Literature 2: JP-A-2017-166016
Patent Literature 3: JP-A-2000-239736
Patent Literature 4: JP-A-2012-177162

SUMMARY OF THE INVENTION

The method disclosed in Patent Literature 1 is based on the knowledge that the irradiation of plasma flame or a laser beam, even when Se is concentrated on the steel sheet surface to improve the film properties, tends to cause film breakage while the electron beam irradiation applies little heat to the forsterite film and is suitable to the magnetic domain subdividing treatment. Accordingly, the method cannot be applied to a method other than the electron beam irradiation method, for example, a magnetic domain subdividing treatment through laser beams or plasma flame. In addition to concentrating Se, concentrating S, Al and the like are necessary to be taken into consideration, but it is difficult to control all the elements into given ranges. The method disclosed in Patent Literature 2 is limited to the magnetic domain subdividing treatment conducted by irradiating electron beams, and the effect to the magnetic domain subdividing treatment conducted by irradiating plasma flame or laser beams is unclear. The method also has a problem that, even in the case of irradiating the electron beam, the stripping of the film cannot be completely prevented when irradiation energy is increased to enhance the effect of improving the iron loss properties. The method has another problem that, as heating and cooling are necessary for a vacuum zone before and after the electron beam irradiation, the equipment costs and the running costs are increased. In the method disclosed in Patent Literature 3, decreasing the pressure inside the finish-annealing furnace may cause the furnace to locally have a negative pressure, allowing air to penetrate into the furnace to possibly cause abnormal combustion of atmospheric gas. In the method disclosed in Patent Literature 4, metal, which is for example Sn or W, is penetrated into the iron matrix to thus increase the tension of the film after the flattening annealing, but there is a problem that the effect of preventing the stripping of the film by the magnetic domain subdividing treatment cannot be obtained sufficiently.

As mentioned above, the method of preventing the stripping of the film by the magnetic domain subdividing treatment is not still sufficient in terms of not only the practical use but also the effect. With the recent growing demand for energy saving, it tends to increase the irradiation energy in the magnetic domain subdividing treatment to further enhance the effect of improving the iron loss property, and hence the conventional method of preventing the stripping of the film has failed to produce sufficient effects.

Aspects of the invention are made in consideration of the above problems of the prior arts, and an object thereof is to provide a grain-oriented electrical steel sheet capable of securing film adhesiveness even when magnetic domain subdividing treatment is conducted at a high energy density and propose a method for advantageously producing the same.

In order to solve the problems, the inventors have studied focusing on what properties of the film and iron matrix are involved in the stripping of the film due to the magnetic domain subdivision. As a result, they have found a new knowledge that both the pickling weight loss caused by pickling the forsterite undercoat film with HCl and the total concentration of Sn, Sb, Mo, and W present in a boundary face between the undercoat film and iron matrix (steel sheet surface) have a large influence on the stripping properties of the film due to the magnetic domain subdividing treatment, and developed the invention.

That is, aspects of the invention include

[1] a grain-oriented electrical steel sheet for magnetic domain subdividing treatment having a forsterite undercoat film,
characterized in that
a pickling weight loss caused by pickling the undercoat film with an aqueous solution of 5 mass % HCl at 60° C. for 60 seconds is not more than 1.8 g/m² and
a total concentration of Sn, Sb, Mo, and W present in a boundary face between the undercoat film and iron matrix is 0.01 to 0.15 mass %.

[2] The grain-oriented electrical steel sheet according to aspects of the invention is characterized by having a component composition comprising C: not more than 0.0050 mass %, Si: 2.5 to 4.5 mass %, Mn: 0.03 to 0.30 mass % and the remainder being Fe and inevitable impurities.

[3] The grain-oriented electrical steel sheet according to aspects of the invention is characterized by containing, in addition to the above component composition, one or two or more selected from Ni: 0.01 to 1.50 mass %, Cr: 0.01 to 0.50 mass %, Cu: 0.01 to 0.50 mass %, P: 0.005 to 0.20 mass %, Sn: 0.005 to 0.50 mass %, Sb: 0.005 to 0.20 mass %, Bi: 0.005 to 0.10 mass %, Mo: 0.005 to 0.10 mass %, B: 0.0002 to 0.0025 mass %, Te: 0.0005 to 0.010 mass %, Nb: 0.001 to 0.010 mass %, V: 0.001 to 0.010 mass %, W: 0.002 to 0.050 mass %, Ti: 0.001 to 0.010 mass % and Ta: 0.001 to 0.010 mass %.

[4] Aspects of the invention also include a method for producing a grain-oriented electrical steel sheet comprising hot rolling a raw steel material comprising C: 0.02 to 0.08 mass %, Si: 2.5 to 4.5 mass %, Mn: 0.03 to 0.30 mass % and the remainder being Fe and inevitable impurities to from a hot-rolled sheet,
subjecting the hot-rolled sheet to a single cold rolling or two or more cold rollings having an intermediate annealing between each cold rolling to form a cold-rolled sheet having a final sheet thickness,
subjecting the cold-rolled sheet to decarburization annealing combined with primary recrystallization,
applying an annealing separator containing not less than 50 mass % MgO onto the steel sheet surface,
subjecting the steel sheet to finish annealing,
applying an insulation film thereto followed by baking, and
subjecting the steel sheet to a magnetic domain subdividing treatment, in which
the annealing separator includes at least one selected from compounds of Sn, Sb, Mo, and W by 0.3 to 5 mass % as converted to a metal with respect to the whole annealing separator, and
in the finish annealing comprising conducting retention treatment of holding the steel sheet at a temperature of not lower than 800° C. but not higher than 950° C. for not less than 10 hours but not more than 100 hours under an inert atmosphere and then conducting purification treatment at a temperature of not lower than 1150° C. but not higher than 1250° C., dry gas containing not less than 1 vol % $H_2$ and having a dew point of not higher than 10° C. is introduced as an atmospheric gas during the time the temperature is from not lower than 1050° C. to the purification treatment temperature so as to achieve a furnace pressure of not less than 3.5 mm$H_2$O.

[5] The raw steel material used in the method for producing a grain-oriented electrical steel sheet according to aspects of the invention is characterized by containing, in addition to the above component composition, any one of the following inhibitor-forming ingredient groups of Groups A to C:

Group A: Al: 0.010 to 0.040 mass % and N: 0.003 to 0.012 mass %,
Group B: Se: 0.0030 to 0.030 mass % and/or S: 0.0040 to 0.030 mass %
Group C: Al: 0.010 to 0.040 mass %, N: 0.003 to 0.012 mass %, Se: 0.0030 to 0.030 mass % and/or S: 0.0040 to 0.030 mass %.

[6] The raw steel material used in the method for producing a grain-oriented electrical steel sheet according to aspects of the invention is characterized in that contents of Al, N, S and Se in the inevitable impurities are Al: less than 0.01 mass %, N: less than 0.0050 mass %, S: less than 0.0040 mass % and Se: less than 0.0030 mass %.

[7] The raw steel material used in the method for producing a grain-oriented electrical steel sheet according to aspects of the invention is characterized by containing, in addition to the above component composition, one or two or more selected from Ni: 0.01 to 1.50 mass %, Cr: 0.01 to 0.50 mass %, Cu: 0.01 to 0.50 mass %, P: 0.005 to 0.20 mass %, Sn: 0.005 to 0.50 mass %, Sb: 0.005 to 0.20 mass %, Bi: 0.005 to 0.10 mass %, Mo: 0.005 to 0.10 mass %, B: 0.0002 to 0.0025 mass %, Te: 0.0005 to 0.010 mass %, Nb: 0.001 to 0.010 mass %, V: 0.001 to 0.010 mass %, W: 0.002 to 0.050 mass %, Ti: 0.001 to 0.010 mass % and Ta: 0.001 to 0.010 mass %.

Aspects of the present invention prevent the stripping of the film even when magnetic domain subdividing treatment is performed at an energy density higher than that in the prior arts, which can not only improve the corrosion resistance and insulation properties of a product sheet but also provide a better effect of reducing iron loss.

DETAILED DESCRIPTION OF EMBODIMENTS OF THE INVENTION

There will be described experiments leading to the development of aspects of the invention.

<Experiment 1>

A steel containing C: 0.068 mass %, Si: 3.38 mass %, Mn: 0.07 mass %, Al: 0.03 mass % and N: 0.008 mass % is melted to form into a slab by a continuous casting method. The slab is then heated to a temperature of 1410° C. and hot-rolled to form a hot-rolled sheet having a sheet thickness of 2.2 mm. The hot-rolled sheet is then subjected to a hot-band annealing at 1050° C. for 60 seconds, primary cold rolling to have an intermediate sheet thickness of 1.7 mm, an intermediate annealing at 1100° C. for 80 seconds, and warm rolling at 200° C. to form a cold-rolled sheet having a final sheet thickness of 0.23 mm. The obtained cold-rolled sheet is then subjected to decarburization annealing combined with primary recrystallization annealing at 830° C. for 100 seconds under a wet atmosphere of 50 vol % $H_2$-50 vol % $N_2$ having a dew point of 57° C. A slurried annealing separator composed mainly of MgO and added with $SnO_2$ by 3 mass % as converted to Sn as an additive is applied to the steel sheet surface and dried. The steel sheet is then subjected to finish annealing of conducting retention treatment of developing secondary recrystallization and purification treatment of holding a temperature of 1150° C. in $H_2$ atmosphere for 20 hours to produce a grain-oriented electrical steel sheet having a forsterite undercoat film. In the retention treatment, the $H_2$ concentration in the atmospheric gas is varied within the range of 0 to 10 vol %, and the retention treatment temperature is varied within the range from 750° C. to 1050° C., and the retention treatment time is varied within a range of 5 to 120 hours. After the retention treatment, from not lower than 1050° C. to the purification treatment temperature (which is hereinafter called as "at the heating in the high-temperature zone"), a dry gas of 98 vol % $N_2$+2 vol % $H_2$ having a dew point of −5° C. is introduced into the furnace as the atmospheric gas while the furnace pressure is varied within the range of 1.5 to 6 mm$H_2$O. Note that, in accordance with aspects of the present invention, the forsterite film contains at least 50 mass % forsterite.

A sample is taken out from the thus-obtained steel sheet having the forsterite undercoat film after the finish annealing, immersed in an aqueous solution of 5% HCl at 60° C. for 60 seconds, and pickled to measure a pickling weight loss (g/m$^2$) of the undercoat film. Note that, in the case of the grain-oriented electrical steel sheet provided with an insulation film on a forsterite undercoat film, the pickling weight loss is measured after the insulation film is removed with a hot alkali.

The steel sheet after the finish annealing is pickled by varying the immersion time in the 5% HCl aqueous solution at 60° C. When an oxygen coating weight (g/m$^2$) reaches 5 to 10% of that before the pickling, the forsterite film is assumed to be removed up to the boundary face between the forsterite film and iron matrix, and the Sn concentration on the steel sheet surface (iron matrix) is quantified by GDS and is defined as the Sn concentration in the "boundary face between the film and iron matrix". Note that the oxygen coating weight means an oxygen weight per unit area (both sides) on an assumption that the analyzed oxygen content in the total thickness of the steel sheet with the forsterite film is present on the steel sheet surface.

An insulation film is applied to the surface of the steel sheet subjected to the finish annealing, and then the steel sheet is dried and subjected to flattening annealing at 800° C. for 60 seconds combined with baking and flattening treatment. The steel sheet after the annealing is subjected to a magnetic domain subdividing treatment by irradiating laser beams on the steel sheet surface at an irradiation energy of 1.5 mJ/mm$^2$ to produce a product sheet.

Next, the surface of the steel sheet after the magnetic domain subdividing treatment is observed by an optical microscope at 10 magnifications to examine the occurrence of the film stripping, which is compared with the pickling weight loss of the steel sheet after the finish annealing. The result reveals, as shown in Table 1, that no film stripping is caused when the pickling weight loss is not more than 1.8 g/m$^2$.

TABLE 1

| | | Sn concentration on boundary face between film and iron matrix (more than-less than: mass %) | | | | | | | | | |
|---|---|---|---|---|---|---|---|---|---|---|---|
| | | 0–0.002 | 0.002–0.005 | 0.005–0.01 | 0.01–0.02 | 0.02–0.05 | 0.05–0.10 | 0.10–0.12 | 0.12–0.15 | 0.15–0.20 | 0.20–0.25 | 0.25– |
| Pickling weight loss (more than- Not more than: g/m$^2$) | 0–0.2 | x | x | x | ○ | ○ | ○ | ○ | ○ | x | x | x |
| | 0.2–0.4 | x | x | x | ○ | ○ | ○ | ○ | ○ | x | x | x |
| | 0.4–0.6 | x | x | x | ○ | ○ | ○ | ○ | ○ | x | x | x |
| | 0.6–0.8 | x | x | x | ○ | ○ | ○ | ○ | ○ | x | x | x |
| | 0.8–1.0 | x | x | x | ○ | ○ | ○ | ○ | ○ | x | x | x |

TABLE 1-continued

| | Sn concentration on boundary face between film and iron matrix (more than-less than: mass %) | | | | | | | | | |
|---|---|---|---|---|---|---|---|---|---|---|
| | 0-0.002 | 0.002-0.005 | 0.005-0.01 | 0.01-0.02 | 0.02-0.05 | 0.05-0.10 | 0.10-0.12 | 0.12-0.15 | 0.15-0.20 | 0.20-0.25 | 0.25- |
| 1.0-1.2 | x | x | x | ○ | ○ | ○ | ○ | ○ | x | x | x |
| 1.2-1.4 | x | x | x | ○ | ○ | ○ | ○ | ○ | x | x | x |
| 1.4-1.6 | x | x | x | ○ | ○ | ○ | ○ | ○ | x | x | x |
| 1.6-1.8 | x | x | x | ○ | ○ | ○ | ○ | ○ | x | x | x |
| 1.8-2.0 | x | x | x | x | x | x | x | x | x | x | x |
| 2.0-2.2 | x | x | x | x | x | x | x | x | x | x | x |
| 2.2- | x | x | x | x | x | x | x | x | x | x | x |

○: No film stripping is confirmed.
x: Film stripping is confirmed.

Figure 1:
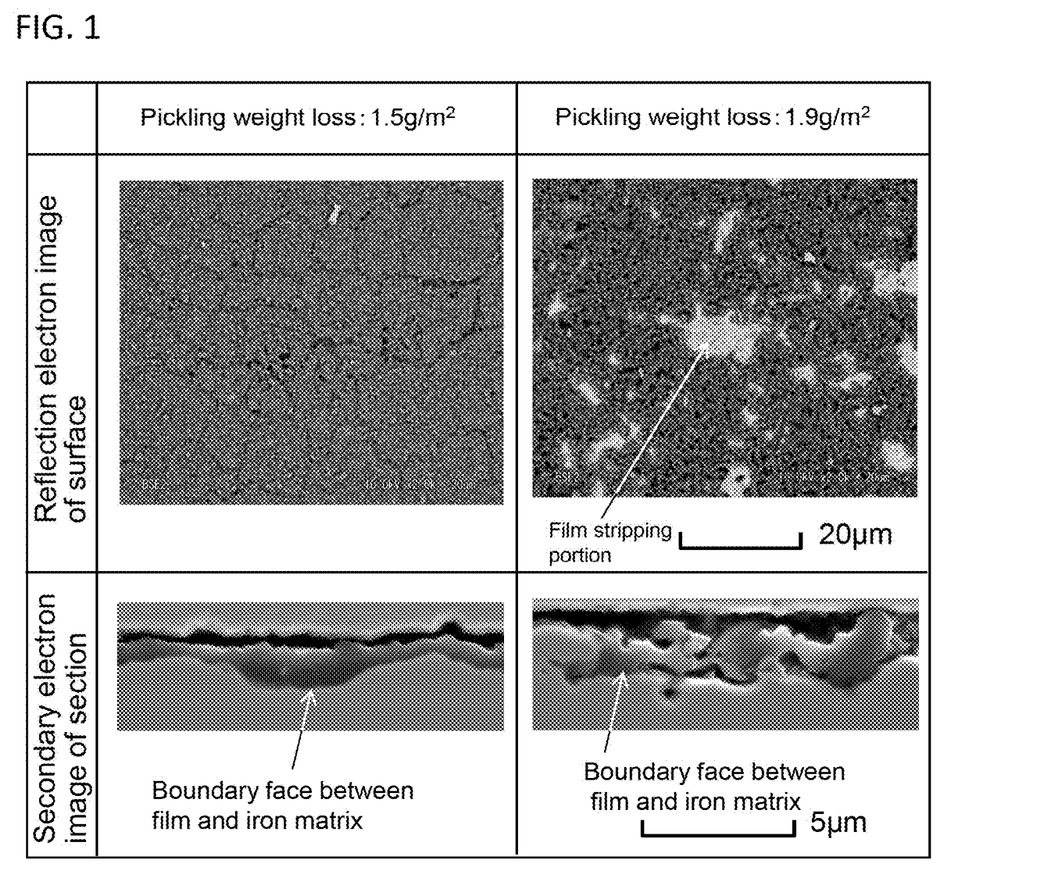
FIG. 1 is photographs showing surface reflection electron images of steel sheet surfaces having different pickling weight losses of undercoat films after pickling, and secondary electron images of film sections.
Figure 2A:
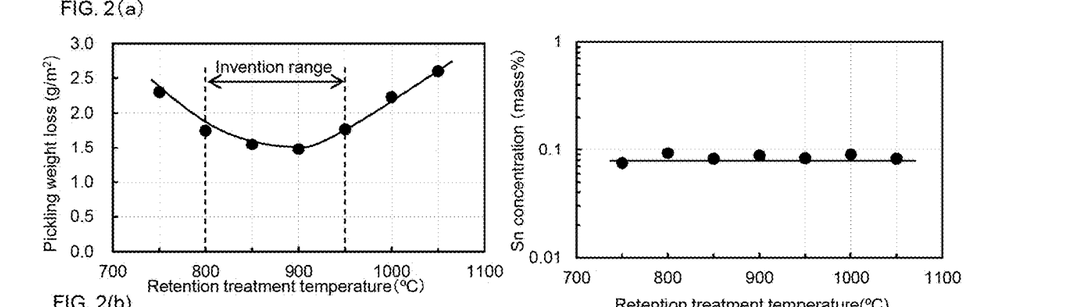
FIGS. 2(a) to 2(d) are graphs showing influences of finish annealing conditions upon pickling weight loss of a steel sheet having an undercoat film and upon the Sn concentration in a boundary face between the film and iron matrix.
Figure 2B:
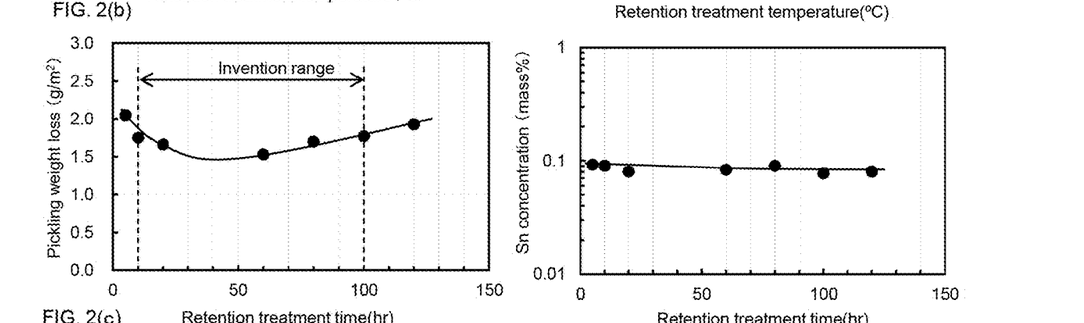
Figure 2C:
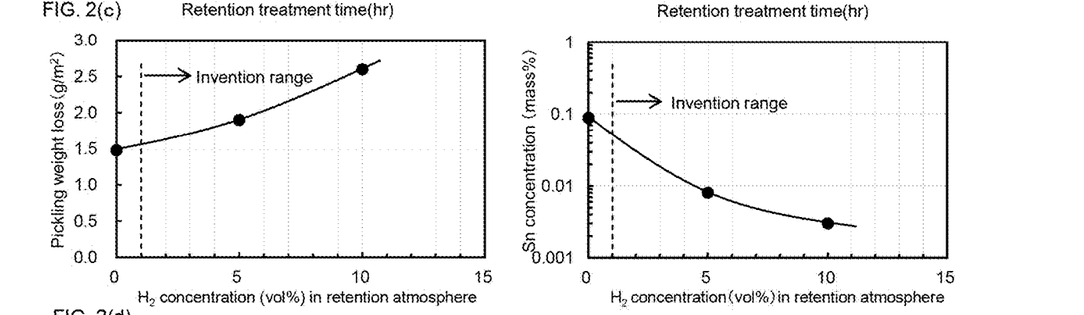
Figure 2D:
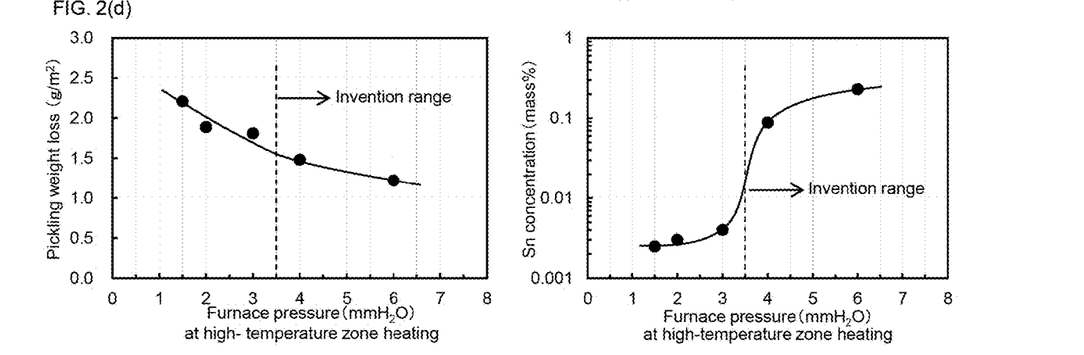

The photographs at the upper part of FIG. 1 are reflection electron images when the steel sheet surfaces after the finish annealing having two different pickling weight losses of 1.5 g/m$^2$ and 1.9 g/m$^2$ are observed by an SEM (scanning type electron microscope), which show that the film stripping is partially caused (white portions in the photograph) in the steel sheet having a high pickling weight loss as 1.9 g/m$^2$, while the whole film thickness is uniformly thin in the steel sheet having the low pickling weight loss as 1.5 g/m$^2$. The photographs at the lower part of FIG. 1 are secondary electron images of the cross-section of the film of the above two steel sheets observed by the SEM. The figure shows that the boundary face between the film and iron matrix is corroded by the pickling to form gaps in the steel sheet having the high pickling weight loss, while such gaps are not formed on the boundary face between the film and iron matrix of the steel sheet having low pickling weight loss after the pickling. Accordingly, it is revealed that the pickling weight loss correlates with the adhesiveness of the undercoat film, that is, the pickling weight loss is an indication that represents the adhesiveness of the undercoat film, and the adhesiveness of the film of the steel sheet after magnetic domain subdividing treatment can be predicted by measuring the pickling weight loss of the steel sheet after the finish annealing.

As seen in Table 1, it is not sufficient to simply reduce the pickling weight loss of the steel sheet after the finish annealing to not more than 1.8 g/m$^2$ in order to prevent the film stripping. In addition to that, it is necessary that the Sn concentration on the boundary face between the film and iron matrix of the steel sheet after the finish annealing, i.e., the Sn concentration of the steel sheet (iron matrix) surface (boundary face between the film and iron matrix) when the forsterite film is completely removed by pickling with HCl falls within the range of 0.01 to 0.15 mass %.

The inventors consider the reason thereof as follows. Sn present on the boundary face between the film and iron matrix, i.e., the steel sheet (iron matrix) surface is considered to have an effect of increasing a high-temperature strength of the steel sheet to thus reduce the deformation quantity of the steel sheet (iron matrix) by heat energy received in the magnetic domain subdividing treatment. However, the above effect cannot be sufficiently obtained with the Sn concentration being less than 0.01 mass %, while the properties of the film itself are deteriorated and the good adhesiveness of the film is not obtained with the Sn concentration being more than 0.15 mass %. As a result, it is considered that when the Sn concentration is within a proper range of 0.01 to 0.15 mass %, stress applied from the iron matrix to the film by the magnetic domain subdividing treatment is decreased by the above effect, thus preventing the film stripping.

After the finish annealing, SnO$_2$ added to the annealing separator remains in the forsterite film or is decomposed into Sn, which is dispersed toward the steel sheet side to remain on the boundary face between the film and iron matrix or penetrate into the steel sheet. Among them, it is the Sn concentration remaining on the boundary face between the film and iron matrix that has a large influence on the film stripping by magnetic domain subdividing treatment. It should be noted that, as seen from Table 1, although the SnO$_2$ amount in the annealing separator is set constant (3 mass %), the Sn concentration on the boundary face between the film and iron matrix varies in this experiment. This means that it is necessary to establish a technique of controlling the concentration of Sn or the like present on the boundary face between the film and iron matrix to a proper range to prevent the film stripping by the magnetic domain subdividing treatment.

<Experiment 2>

The inventors have studied a method of controlling the pickling weight loss and Sn concentration on the boundary face between the film and iron matrix to proper ranges based on the above experiment results.

The standard condition of the finish annealing is set such that after retention treatment in an atmosphere of 100 vol % N$_2$ at 900° C. for 40 hours, the steel sheet is heated to the purification treatment temperature of 1150° C., and at the heating in the high-temperature zone of from not lower than 1050° C. to the purification treatment temperature, a dry gas of 98 vol % N$_2$+2 vol % H$_2$ having a dew point of −5° C. is introduced as an atmospheric gas so as to achieve a pressure inside furnace into 4 mmH$_2$O. There are produced finish-annealed steel sheets by varying the retention treatment temperature, retention treatment time, the H$_2$ concentration of the atmospheric gas to be introduced in the retention treatment, and the pressure inside the furnace (furnace pressure) of the atmospheric gas at the heating in the high-temperature zone of from not lower than 1050° C. to the purification treatment temperature under the other conditions being the same as in the above Experiment 1 to thereby examine changes of the pickling weight loss of the steel sheet after the finish annealing and the Sn concentration on the boundary face between the film and iron matrix.

FIG. 2 shows the experiment result and reveals the following.

The retention treatment temperature does not largely affect the Sn concentration on the boundary face between the film and iron matrix but the pickling weight loss. When the retention treatment temperature is too high or too low, the pickling weight loss increases, and there is a proper range to minimize the pickling weight loss (FIG. 2(a)).

The retention treatment time has a tendency similar to the retention treatment temperature, that is, it does not largely affect the Sn concentration on the boundary face between the film and iron matrix but largely affects the pickling weight loss. When the retention treatment time is too long or too short, the pickling weight loss increases, and there is a proper range to minimize the pickling weight loss (FIG. 2(b)).

The $H_2$ concentration in the atmospheric gas during the retention treatment affects both the pickling weight loss and the Sn concentration on the boundary face between the film and iron matrix. As the $H_2$ concentration is higher, the pickling weight loss tends to more increase while the Sn concentration on the boundary face between the film and iron matrix more decreases (FIG. 2(c)).

The pressure inside the furnace (furnace pressure) of $H_2$-containing atmospheric gas at the heating in the high-temperature zone of from 1050° C. to the purification treatment temperature also affects both the pickling weight loss and the Sn concentration on the boundary face between the film and iron matrix. As the furnace pressure is higher, the pickling weight loss more decreases while the Sn concentration on the boundary face between film and iron matrix more increases (FIG. 2(d)).

The inventors have the following thoughts on the result.

When the retention treatment is carried out at a proper temperature for a proper time in the finish annealing, the forsterite film is formed slowly during the retention treatment, resulting in finer and denser forsterite grain size and improved grain boundary strength. As a result, the progression of the corrosion by the pickling is delayed to decrease the pickling weight loss. When the retention treatment temperature is too low, however, the forsterite film is hardly formed in the retention treatment temperature range and rapidly reacts at the subsequent heating process, causing a coarse structure having large gaps. On the other hand, when the retention treatment temperature is too high, the reaction rate of the film formation is increased, to cause coarse forsterite grain size and weaken grain boundary strength, resulting in an increase in the pickling weight loss. When the retention treatment time is too short, the effect of the retention treatment cannot be obtained sufficiently, while when it is too long, the forsterite grain size is coarsened. Also, when the $H_2$ concentration in the retention treatment is increased, the film-forming reaction is promoted to coarsen the forsterite grain size, resulting in an increase in pickling weight loss. When the furnace pressure is increased at the heating in the high-temperature zone, the replacement of gas between coiled steel sheets (between coil layers) with the atmospheric gas is delayed, which slows the formation of the forsterite film and reduces the pickling weight loss.

Since $SnO_2$ is not reacted in the retention treatment under the $N_2$ atmosphere, the influence of the retention treatment temperature or the retention treatment time upon the Sn concentration on the boundary face between the film and iron matrix is small. In the atmosphere containing $H_2$ gas, however, $SnO_2$ is decomposed and dispersed toward the steel sheet side, resulting in penetration into the inside of steel. Furthermore, in the high-temperature zone of not lower than 1050° C. in the finish annealing, Sn on the surface of the steel sheet (iron matrix) is oxidized by additional oxidation and inversely incorporated into the film, and thus the Sn concentration on the boundary face between the film and iron matrix is largely decreased. When the pressure (furnace pressure) of the atmospheric gas is increased, however, the replacement of the atmosphere between the coil layers is delayed, and thus the decomposition of $SnO_2$ in the annealing separator is also delayed, resulting in $SnO_2$ remaining in the high-temperature zone in the finish annealing. The remaining $SnO_2$ is slowly decomposed to continuously penetrate Sn into steel, and as a result, the Sn concentration on the boundary face between the film and iron matrix is maintained high.

It is important that, as mentioned above, Sn is concentrated on the boundary face between the film and iron matrix. Adding Sn to the raw steel material can increase the Sn concentration on the boundary face between the film and iron matrix, but causing problems that the rolling properties are deteriorated and the surface defect is caused. Even if Sn of the target concentration of 0.01 to 0.15 mass % is added to the raw steel material, it is absorbed in the forsterite film during the finish annealing, and hence the Sn concentration on the boundary face between the film and iron matrix after the finish annealing is reduced to less than 0.01 mass %. Moreover, the Sn concentration on the boundary face between the film and iron matrix can be increased by adding Sn to the raw steel material to a concentration larger than the above value, which remarkably hinders the producing property as Sn is an element of badly affecting the rolling properties and the like. On the other hand, adding Sn to the annealing separator does not impair productivity because the production rate is not impaired.

The above results reveal that, in order to reduce the pickling weight loss of the undercoat film of the steel sheet after the finish annealing and also control the Sn concentration on the boundary face between the film and iron matrix to a given range, it is effective to properly adjust the retention conditions in the finish annealing and the furnace pressure of the atmospheric gas at the heating in the high-temperature zone of from 1050° C. to the purification treatment temperature. The Sn compound is used as an additive in the experiments, but the inventors have confirmed that Sb, Mo, and W have the same effect as Sn and can be used as the additive in accordance with aspects of the invention.

There will be described the component composition of a raw steel material (slab) used in a production of a grain-oriented electrical steel sheet according to aspects of the invention below.

C: 0.02 to 0.08 mass %

When C is less than 0.02 mass %, there is caused a defect impairing the production, such that grain boundary strengthening effect by C is lost to cause cracking in the slab. When C exceeds 0.08 mass %, it is hard to decrease C to not more than 0.005 mass %, with which no magnetic aging is caused, by decarburization annealing. Therefore, C is in the range of 0.02 to 0.08 mass %, preferably in the range of 0.025 to 0.075 mass %.

Si: 2.5 to 4.5 mass %

Si is an element necessary for increasing the specific resistance of steel, thus reducing iron loss. This effect is not sufficient with the content of less than 2.5 mass %, while when it exceeds 4.5 mass %, the workability of steel is deteriorated to make the production by rolling difficult. Therefore, Si falls within the range of 2.5 to 4.5 mass %, preferably 2.8 to 4.0 mass %.

Mn: 0.03 to 0.30 mass %

Mn is an element necessary for improving the hot workability of steel. This effect is insufficient with the C content of less than 0.03 mass %, while when it exceeds 0.30 mass %, the magnetic flux density of a product sheet lowers.

Therefore, Mn falls within the range of 0.03 to 0.30 mass %, preferably 0.04 to 0.20 mass %.

Ingredients other than C, Si, and Mn are different depending on the case with or without using an inhibitor to develop secondary recrystallization in the finish annealing.

When using an inhibitor, for example, an AlN-based inhibitor to develop secondary recrystallization, the inhibitor is preferable to contain Al: 0.010 to 0.040 mass % and N: 0.003 to 0.012 mass %. When using MnS·MnSe-based inhibitor, the inhibitor is preferable to include the above-described Mn content and one or two selected from S: 0.0040 to 0.030 mass % and Se: 0.0030 to 0.030 mass %. When each content is less than the above lower limit, the effect of the inhibitors cannot be sufficiently obtained. When it exceeds the upper limit, the inhibitor ingredients remain at a non-solid solution state at the heating of the slab to thus deteriorate the magnetic properties. Note that the AlN-based inhibitor and the MnS/MnSe-based inhibitor may be used together.

On the other hand, when using no inhibitor to develop secondary recrystallization, it is preferable to use a raw steel material with the contents of the above-described inhibitor-forming ingredients of Al, N, S, and Se decreased as low as possible, that is, containing Al: less than 0.01 mass %, N: less than 0.0050 mass %, S: less than 0.0040 mass % and Se: less than 0.0030 mass %.

In the raw steel material used in a production of a grain-oriented electrical steel sheet according to aspects of the invention, the remainder other than the above ingredients is Fe and inevitable impurities. Moreover, to improve the magnetic properties, there may be added one or two or more selected from Ni: 0.01 to 1.50 mass %, Cr: 0.01 to 0.50 mass %, Cu: 0.01 to 0.50 mass %, P: 0.005 to 0.20 mass %, Sn: 0.005 to 0.50 mass %, Sb: 0.005 to 0.20 mass %, Bi: 0.005 to 0.10 mass %, Mo: 0.005 to 0.10 mass %, B: 0.0002 to 0.0025 mass %, Te: 0.0005 to 0.010 mass %, Nb: 0.001 to 0.010 mass %, V: 0.001 to 0.010 mass %, W: 0.002 to 0.050 mass %, Ti: 0.001 to 0.010 mass % and Ta: 0.001 to 0.010 mass %. Among the above ingredients, particularly Sn, Sb, Mo, and W contribute to an increase in the concentrations of these metals on the boundary face between the film and iron matrix and are preferable to be added to the extent that the productivity is not impaired.

There will be described a method for producing a grain-oriented electrical steel sheet according to aspects of the invention below.

Steel having the aforementioned component composition is melted by a usual refining process. The steel may be formed into a raw steel material (slab) by the conventionally well-known ingot making-blooming method or continuous casting method or may be formed into a thin cast strip having a thickness of not more than 100 mm by a direct casting method. The slab is heated according to the usual manner. For example, it is heated to a temperature not lower than about 1350° C. when containing the inhibitor ingredient or to a temperature not higher than 1300° C. when containing no inhibitor ingredient and hot-rolled under the conventionally well-known conditions. When containing no inhibitor ingredient, the slab may be hot-rolled immediately after the casting without heating. In the case of the thin cast strip, it may be hot-rolled or may proceed to subsequent steps without the hot rolling.

The hot-rolled sheet obtained by the hot rolling is subjected to hot-band annealing as necessary. The hot-band annealing is preferably conducted at an annealing temperature of 800 to 1150° C. in order to obtain good magnetic properties. When the annealing temperature is lower than 800° C., a band structure formed by the hot rolling remains, thus failing to obtain a primary recrystallization texture of regulated grains, and thus the development of secondary recrystallization is blocked. On the other hand, when the annealing temperature exceeds 1150° C., the grain size after the hot-band annealing is too coarsened to obtain the primary recrystallization texture of regulated grains as well.

The hot-rolled sheet after the hot rolling or after the hot-band annealing is subjected to a single cold rolling or two or more cold rollings having an intermediate annealing between each cold rolling to form a cold-rolled sheet with a final sheet thickness. The temperature of the intermediate annealing is preferable to be in the range of 900 to 1200° C. When the temperature is lower than 900° C., the recrystallized grains after the intermediate annealing are more fined, and Goss nuclei in the primary recrystallization texture tend to be decreased to deteriorate the magnetic properties of the product sheet. When the temperature exceeds 1200° C., the crystal grains are too coarsened to obtain the primary recrystallization texture of regulated grains.

Performing the cold rolling for rolling to the final sheet thickness (final cold rolling) by heating the steel sheet to a temperature of 100° C. to 300° C. or performing one or more aging treatments at a temperature of 100 to 300° C. during the cold rolling is effective in improving the primary recrystallization texture and the magnetic properties.

The cold-rolled sheet with the final sheet thickness is then subjected to decarburization annealing combined with primary recrystallization annealing. The decarburization annealing is preferable to be conducted at a temperature of not lower than 700° C. but not higher than 900° C. and for a time of not less than 30 seconds but not more than 300 seconds. When the annealing temperature is lower than 700° C. or the annealing time is less than 30 seconds, the magnetic properties are deteriorated due to insufficient decarburization or the too-small primary recrystallization grain size. When the annealing temperature exceeds 900° C. or the annealing time exceeds 300 seconds, the magnetic properties are also deteriorated because primary recrystallization grains are made too large. The decarburization annealing decreases C in steel to not more than 0.0050 mass % with which no magnetic aging is caused.

After an application of an annealing separator to the surface, the steel sheet after the decarburization annealing is dried and subjected to finish annealing comprised of retention treatment of holding the steel sheet at a high temperature for a long time to develop secondary recrystallization and purification treatment conducted at a higher temperature.

The annealing separator needs to contain at least 50 mass % MgO as the main ingredient and at least one compound of Sn, Sb, Mo, and W as an additive within the range of 0.3 to 5 mass % as converted to a metal with respect to the whole of the annealing separator. These elements are largely different in size from Fe, so that migration resistance of dislocation is increased to increase high-temperature strength of the steel sheet, suppressing heat deformation in the magnetic domain subdividing treatment to mitigate the stress of the film applied from the iron matrix, and hence the film stripping by the magnetic domain subdividing treatment is hardly caused. The preferable content of the additive is within the range of 0.8 to 4 mass %.

Simply adding these additives into the annealing separator merely causes the elements, Sn, Sb, Mo, and W to penetrate evenly into the steel during the finish annealing, and in some cases, these elements are re-oxidized in the vicinity of the steel sheet surface and inversely incorporated into the undercoat film to form a layer lacking these elements in the vicinity of the steel sheet surface. Since the high-temperature deformation behavior of the steel sheet (iron matrix) surface in contact with the undercoat film largely affects the film stripping after the magnetic domain subdividing treatment, the above elements are necessary to be concentrated on the iron matrix surface to prevent the film stripping through the magnetic domain subdivision.

In accordance with aspects of the invention, therefore, it is important to properly adjust the finish annealing pattern in order for the above elements to be concentrated on the steel sheet surface (iron matrix). It is also important to adjust the finish annealing conditions to reduce the pickling weight loss of the undercoat film. Specifically, the finish annealing in accordance with aspects of the invention needs to satisfy the following two conditions:

1) the retention treatment for developing the secondary recrystallization involves holding the steel sheet at a temperature of not lower than 800° C. but not higher than 950° C. in an inert gas atmosphere for not less than 10 hours but not more than 100 hours;
2) after the retention treatment, in the heating to a temperature of not lower than 1150° C. but not higher than 1250° C. for purification treatment, a dry gas containing not less than 1 vol % of $H_2$ and having a dew point of not higher than 10° C. is introduced as the atmospheric gas at the heating in the high-temperature zone of from not lower than 1050° C. to the purification treatment temperature such that the furnace pressure reaches not less than 3.5 $mmH_2O$.

The reason for using an inert gas as the atmosphere in the retention treatment is as follows. In a reducing atmosphere containing $H_2$ or the like, the additive of Sn or the like is decomposed during the retention treatment into a metallic element such as Sn, which is dispersed and penetrated in steel, failing to be concentrated sufficiently on the boundary face between the film and iron matrix. The reason for holding the steel sheet at the temperature of not lower than 800° C. but not higher than 950° C. for not less than 10 hours but not more than 100 hours is that the retention treatment with the retention treatment temperature of lower than 800° C. and the retention treatment time of less than 10 hours cannot produce the effect of reducing the pickling loss. When the retention treatment temperature exceeds 950° C. and the retention treatment time exceeds 100 hours, the formation of the undercoat film is too progressed to rather increase the pickling weight loss. The preferable retention conditions are such that the steel sheet is held at a temperature of not lower than 830° C. but not higher than 930° C. for a time of not less than 20 hours but not more than 60 hours.

The reason for containing at least 1 vol % $H_2$ in the atmospheric gas at the heating in the high-temperature zone of from not lower than 1050° C. to the purification treatment temperature is as follows. The inclusion of $H_2$ causes the compound of Sn or the like (additive) to be decomposed into a metallic element, which can be penetrated into steel. When the $H_2$ content is less than 1 vol %, however, the above effect cannot be obtained. Further, the atmospheric gas needs to have a dew point of not higher than 10° C. When it exceeds 10° C., the formation reaction of the forsterite film is delayed to deteriorate the film properties, easily causing the film stripping by the magnetic domain subdivision. The atmospheric gas is preferable to have an $H_2$ concentration of not less than 5 vol % and a dew point of not higher than 0° C.

It is important that the pressure inside the furnace (furnace pressure) of the atmospheric gas at the heating in the high-temperature zone is not less than 3.5 $mmH_2O$. This delays the replacement of the gas between the steel sheets wound into a coil (between coil layers) with the atmospheric gas in the furnace, and as a result, the metallic element such as Sn contained in the annealing separator is effectively dispersed and penetrated into the steel sheet including the film, which is effective for the concentration onto the boundary face between the film and iron matrix. Further, increasing the furnace pressure delays the replacement of the gas between the coil layers and allows the slow formation of the forsterite film. As a result, the grain size of forsterite is more fined to densify the film and increase the grain boundary strength of forsterite, which has an effect of decreasing the pickling weight loss. The furnace pressure is preferably not less than 4.0 $mmH_2O$, more preferably not less than 4.5 $mmH_2O$. Note that the adjustment of the furnace pressure can be performed by adjusting the amount of gas introduced into the furnace and the amount of exhaust gas.

The purification treatment following the retention treatment in the finish annealing is preferably conducted such that the steel sheet is held at a temperature of not lower than 1150° C. but not higher than 1250° C. for not less than 5 hours but not more than 50 hours in an $H_2$ atmosphere. Purification treatment conducted at a purification treatment temperature of lower than 1150° C. for a purification treatment time of less than 5 hours results in insufficient purification. When the purification treatment temperature exceeds 1250° C. or the purification treatment time exceeds 50 hours, Sn that has been concentrated on the boundary face is dispersed into the inside of the steel sheet, causing insufficient surface concentration of the metal such as Sn or the like on the boundary face between the film and iron matrix. The purification treatment allows the inhibitor-forming ingredients (Al, N, S, and Se) contained in the raw steel material sheet to decrease to an inevitable impurity level.

The steel sheet subjected to the finish annealing satisfying the above conditions has the pickling weight loss of the forsterite film of not more than 1.8 $g/m^2$, which hardly causes the film stripping by the magnetic domain subdivision. Also, the steel sheet subjected to the finish annealing satisfying the above conditions has a total concentration (converted to metal) of Sn, Sb, Mo, and W on the boundary face between the film and iron matrix of 0.01 to 0.15 mass %, which hardly causes the film stripping even when subjected to high-density heat energy by the magnetic domain subdivision. As mentioned above, when measuring the pickling weight loss of the grain-oriented electrical steel sheet (product sheet) that has an insulation film formed on the forsterite undercoat film, it is necessary to conduct the measurement after removing the insulation film with hot alkali.

The method of measuring the concentrations of Sn, Sb, Mo, and W on the boundary face between the film and iron matrix includes such methods of analyzing the steel sheet surface (iron matrix surface) with fluorescent X-ray after the forsterite film is removed by pickling, as mentioned above; determining quantity by GDS; and analyzing a cross-sectional portion just below the film by AES, EPMA or the like, and any of these methods may be used.

The thus-obtained grain-oriented electrical steel sheet according to aspects of the invention has a component composition comprising C: not more than 0.0050 mass %, Si: 2.5 to 4.5 mass %, Mn: 0.03 to 0.30 mass %, and the remainder being Fe and inevitable impurities.

Also, when one or two or more selected from Ni: 0.01 to 1.50 mass %, Cr: 0.01 to 0.50 mass %, Cu: 0.01 to 0.50 mass %, P: 0.005 to 0.20 mass %, Sn: 0.005 to 0.50 mass %, Sb:

0.005 to 0.20 mass %, Bi: 0.005 to 0.10 mass %, Mo: 0.005 to 0.10 mass %, B: 0.0002 to 0.0025 mass %, Te: 0.0005 to 0.010 mass %, Nb: 0.001 to 0.010 mass %, V: 0.001 to 0.010 mass %, W: 0.002 to 0.050 mass %, Ti: 0.001 to 0.010 mass % and Ta: 0.001 to 0.010 mass % is contained in the raw steel material for the grain-oriented electrical steel sheet, the element remains in the product sheet as it is.

The steel sheet after the finish annealing is subjected to water washing, brushing, pickling, and the like for removal of unreacted annealing separator attached to the steel sheet surface, coated with an insulation film, dried, baked by flattening annealing or the like, and then subjected to a magnetic domain subdividing treatment.

The method for the magnetic domain subdividing treatment may use such a commonly-conducted method as introducing linear or dot-like heat strain or impact strain into the final product sheet by irradiating a laser beam, electron beam, plasma flame, or the like to the steel sheet surface.

The thus-produced grain-oriented electrical steel sheet according to aspects of the invention has a high film adhesiveness, so that not only the corrosion resistance and insulation property are excellent but also the film stripping after the magnetic domain subdividing treatment is hardly caused. Accordingly, the irradiation energy of the magnetic domain subdividing treatment can be increased to an ideal strength with which the iron loss is most improved, and consequently, the effect of improving the iron loss larger than the conventional ones can be obtained.

Example 1

A steel slab having a component composition comprising C: 0.070 mass %, Si: 3.43 mass %, Mn: 0.08 mass %, Al: 0.005 mass %, N: 0.004 mass %, S: 0.002 mass %, Sb: 0.02 mass % and the remainder being Fe and inevitable impurities is produced by a continuous casting method, heated to 1250° C., and hot-rolled to form a hot-rolled sheet with a sheet thickness of 2.4 mm. The hot-rolled sheet is then subjected to a primary cold rolling to an intermediate sheet thickness of 1.8 mm, an intermediate annealing at 1100° C. for 20 seconds, and a secondary cold rolling to form a cold-rolled sheet with a final sheet thickness of 0.27 mm, and decarburization annealing combined with primary recrystallization annealing. The decarburization annealing is conducted at 840° C. for 100 seconds under a wet atmosphere of 50 vol % $H_2$-50 vol % $N_2$ having a dew point of 55° C.

A slurried annealing separator composed mainly of MgO and containing various amounts of compounds of Sn, Sb, Mo, and W as an additive as shown in Table 2 is applied to the steel sheet surface after the decarburization annealing and is dried. The steel sheet is then subjected to finish annealing comprised of retention treatment of holding the steel sheet at 920° C. for 80 hours under an Ar atmosphere and purification treatment conducted at 1200° C. for 10 hours in an $H_2$ atmosphere. In this case, a dry gas containing 20 vol % $H_2$ and having a dew point of −20° C. as an atmospheric gas is introduced such that the pressure inside the furnace (furnace pressure) reaches 6 mmH$_2$O at the heating from 1050° C. to the purification treatment temperature (at the heating in the high-temperature zone).

The steel sheet having a forsterite film after the finish annealing is pickled by immersing in an aqueous solution of 5% HCl at 60° C. for 60 seconds as in Experiment 1 to measure a pickling weight loss (g/m$^2$) of the undercoat film thereof, while after conducting pickling with hydrochloric acid to reduce the coating weight converted to oxygen to 5 to 10% of that before the pickling, the total concentration of Sn, Sb, Mo and W on the boundary face between the film and iron matrix are measured under the condition of 20 kV and 2 mA in the air with a fluorescent X-ray measuring device and qualified by a calibration curve previously prepared.

Next, after removal of unreacted annealing separator, the steel sheet after the finish annealing is coated with an insulation film, subjected to flattening annealing combined with baking and a flattening treatment, and magnetic domain subdividing treatment by irradiating electron beams to the steel sheet surface at a current density of 80 mA/mm$^2$ to produce a product sheet, on which whether film stripping is caused is examined by means of an optical microscope (10 magnifications).

Table 2 shows the measurement result. It reveals that applying the aspects of present invention prevents the film stripping by magnetic domain subdividing treatment.

TABLE 2

| No | Additive in annealing separator Kind | Addition amount (as converted to metal: mass %) | Pickling weight loss (g/m$^2$) | Concentration of (Sn + Sb + Mo + W) on boundary face between film and iron matrix (mass %) | Presence or absence of film stripping after magnetic domain subdividing treatment | Remarks |
|---|---|---|---|---|---|---|
| 1 | Na$_2$SnO$_3$ | 2 | 1.72 | 0.075 | Absence | Inventive Example |
| 2 | SnCl$_2$ | 2 | 1.55 | 0.082 | Absence | Inventive Example |
| 3 | SnO | 2 | 1.63 | 0.084 | Absence | Inventive Example |
| 4 | SnO$_2$ | 2 | 1.74 | 0.078 | Absence | Inventive Example |
| 5 | SnSO$_4$ | 2 | 1.66 | 0.076 | Absence | Inventive Example |
| 6 | Sb$_2$(SO$_4$)$_3$ | 2 | 1.41 | 0.082 | Absence | Inventive Example |
| 7 | Sb$_2$O$_3$ | 0.2 | 1.66 | 0.007 | Presence | Comparative Example |
| 8 | Sb$_2$O$_3$ | 0.5 | 1.52 | 0.031 | Absence | Inventive Example |
| 9 | Sb$_2$O$_3$ | 2 | 1.74 | 0.078 | Absence | Inventive Example |
| 10 | Sb$_2$O$_3$ | 5 | 1.56 | 0.125 | Absence | Inventive Example |
| 11 | Sb$_2$O$_3$ | 7 | 1.56 | 0.166 | Presence | Comparative Example |
| 12 | SbCl$_3$ | 2 | 1.72 | 0.078 | Absence | Inventive Example |
| 13 | MoO$_3$ | 1 | 1.47 | 0.041 | Absence | Inventive Example |
| 14 | MoO$_3$ | 2 | 1.66 | 0.084 | Absence | Inventive Example |
| 15 | MoO$_3$ | 5 | 1.52 | 0.129 | Absence | Inventive Example |
| 16 | Na$_2$MoO$_4$ | 2 | 1.68 | 0.082 | Absence | Inventive Example |

TABLE 2-continued

| No | Additive in annealing separator Kind | Addition amount (as converted to metal: mass %) | Pickling weight loss (g/m²) | (Sn + Sb + Mo + W) on boundary face between film and iron matrix (mass %) | Presence or absence of film stripping after magnetic domain subdividing treatment | Remarks |
|---|---|---|---|---|---|---|
| 17 | $W_2O_3$ | 2 | 1.56 | 0.076 | Absence | Inventive Example |
| 18 | $WO_3$ | 2 | 1.52 | 0.079 | Absence | Inventive Example |
| 19 | $H_2WO_4$ | 2 | 1.44 | 0.074 | Absence | Inventive Example |
| 20 | SnO: 3 + $WO_3$: 2 | 5 | 1.44 | 0.126 | Absence | Inventive Example |
| 21 | $Sb_2O_3$: 1 + $MoO_3$: 2 | 3 | 1.44 | 0.096 | Absence | Inventive Example |

Example 2

A steel slab having a component composition comprising C: 0.06 mass %, Si: 3.25 mass %, Mn: 0.07 mass %, Al: 0.015 mass %, N: 0.006 mass %, S: 0.002 mass %, Cu: 0.08 mass % and the remainder being Fe and inevitable impurities is produced by a continuous casting method, heated to 1380° C., hot-rolled to form a hot-rolled sheet having a sheet thickness of 2.4 mm, and subjected to hot-band annealing at 1000° C. for 50 seconds, a primary cold rolling to an intermediate sheet thickness of 1.8 mm, an intermediate annealing at 1060° C. for 20 seconds, and a secondary cold rolling to form a cold-rolled sheet having a final sheet thickness of 0.23 mm. The cold-rolled sheet is then subjected to decarburization annealing combined with primary recrystallization annealing. Note that the decarburization annealing is conducted at 840° C. for 100 seconds under a wet atmosphere of 50 vol % $H_2$-50 vol % $N_2$ having a dew point of 56° C.

A slurried annealing separator composed mainly of MgO and containing $WO_3$ by 1 mass % as converted to W is applied to the surface of the steel sheet after the decarburization annealing and is dried. Then, the steel sheet is subjected to finish annealing comprised of retention treatment of holding the steel sheet at 920° C. for 50 hours under an Ar atmosphere and purification treatment conducted at 1200° C. for 10 hours under an $H_2$ atmosphere. At the heating in the high-temperature zone of from 1050° C. to the purification treatment temperature, the pressure inside the furnace (furnace pressure) is controlled to 6 mmH$_2$O, while the $H_2$ concentration and the dew point of an atmospheric gas introduced into the furnace are varied within ranges of the $H_2$ concentration: 0 to 80 vol % and the dew point: −50 to 20° C. as shown in Table 3.

Measurement is performed the pickling weight loss and the concentration of W on the boundary face between the film and iron matrix of the steel sheet having a forsterite film after the finish annealing, as in Example 1.

After removal of unreacted annealing separator, the steel sheet after the finish annealing is coated in an insulation coating, subjected to flattening annealing combined with baking and flattening treatment, and subjected to magnetic domain subdividing treatment, which is conducted by irradiating electron beams to the steel sheet surface at a current density of 80 mA/mm² to produce a product sheet, on which whether film stripping is caused is examined as in Example 1.

Table 3 shows the measurement result. As seen from this table, the finish annealing conducted under the conditions in conformity with the present invention prevents the film stripping by magnetic domain subdividing treatment.

TABLE 3

| No | Atmospheric gas in heating in high-temperature zone | | Pickling weight loss (g/m²) | Concentration of W on boundary face between film and iron matrix (mass %) | Presence or absence of film stripping after magnetic domain subdividing treatment | Remarks |
|---|---|---|---|---|---|---|
| | $H_2$ concentration (vol %) | Dew point (° C.) | | | | |
| 1 | 0 | −50 | 2.52 | 0.091 | Presence | Comparative Example |
| 2 | 1 | −25 | 1.63 | 0.084 | Absence | Inventive Example |
| 3 | 2 | −24 | 1.51 | 0.084 | Absence | Inventive Example |
| 4 | 5 | −24 | 1.32 | 0.078 | Absence | Inventive Example |
| 5 | 10 | −24 | 0.91 | 0.071 | Absence | Inventive Example |
| 6 | 20 | −23 | 0.82 | 0.068 | Absence | Inventive Example |
| 7 | 50 | −23 | 1.26 | 0.069 | Absence | Inventive Example |
| 8 | 80 | −23 | 1.74 | 0.065 | Absence | Inventive Example |
| 9 | 75 | −23 | 1.58 | 0.078 | Absence | Inventive Example |
| 10 | 75 | 0 | 1.61 | 0.082 | Absence | Inventive Example |
| 11 | 75 | 3 | 1.73 | 0.088 | Absence | Inventive Example |
| 12 | 75 | 8 | 1.79 | 0.106 | Absence | Inventive Example |
| 13 | 75 | 11 | 2.01 | 0.108 | Presence | Comparative Example |
| 14 | 75 | 18 | 2.31 | 0.115 | Presence | Comparative Example |
| 15 | 75 | 20 | 2.56 | 0.127 | Presence | Comparative Example |

Example 3

Steel slabs having various component compositions as shown in Table 4 and the remainder being Fe and inevitable impurities are produced by a continuous casting method. Among them, the slabs containing inhibitor-forming ingredients (Nos. 1 to 3 in Table 4) and the slabs containing inhibitor-forming ingredients (Nos. 4 to 24 in Table 4) are heated to 1200° C. and 1380° C., respectively, each hot-rolled to form a hot-rolled sheet having a sheet thickness of 2.0 mm, subjected to hot-band annealing at 1030° C. for 10 seconds, cold-rolled to form a cold-rolled sheet having a final sheet thickness of 0.23 mm, and subjected to decarburization annealing combined with a primary recrystallization annealing. Note that the decarburization annealing is conducted at 840° C. for 100 seconds under a wet atmosphere of 50 vol % $H_2$-50 vol % $N_2$ having a dew point of 61° C.

A slurried annealing separator composed mainly of MgO and containing $MoO_3$ by 2 mass % as converted to Mo is applied to the steel sheet surface after the decarburization annealing and is dried. Then, the steel sheet is subjected to finish annealing comprised of retention treatment of holding the steel sheet at 920° C. for 50 hours under an Ar atmosphere and purification treatment conducted at 1200° C. for 10 hours under an $H_2$ atmosphere. At the heating in the high-temperature zone from 1050° C. to the purification treatment temperature, a dry gas containing 75 vol % $H_2$ and having a dew point of −20° C. as an atmospheric gas is introduced into the furnace such that the pressure inside the furnace (furnace pressure) reaches 6 $mmH_2O$.

Measurement is performed on the pickling weight loss, and the total concentration of Sn, Sb, and Mo on the boundary face between the film and iron matrix of the steel sheet having a forsterite film after the finish annealing, as in Example 1.

After removal of unreacted annealing separator, the steel sheet after the finish annealing is coated in an insulation coating, subjected to flattening annealing combined with baking and flattening treatment, and subjected to magnetic domain subdividing treatment by irradiating electron beams to the steel sheet surface at a current density of 80 $mA/mm^2$ to produce a product sheet, on which whether film stripping is caused is examined as in Example 1.

Table 4 shows measurement results of the pickling weight loss, total concentration of Sn, Sb, and Mo on the boundary face between the film and iron matrix, and whether or not the film stripping is caused. As seen from the table, the finish annealing conducted under conditions in conformity with the present invention prevents the film stripping by magnetic domain subdividing treatment.

TABLE 4

| No | \multicolumn{8}{c}{Chemical composition (mass %)} | Pickling weight loss ($g/m^2$) | Concentration (mass %) of (Sn + Sb + Mo) on boundary face between film and iron matrix | Presence or absence of film stripping after magnetic domain subdividing treatment | Remarks |
|---|---|---|---|---|---|---|---|---|---|---|---|---|
| | C | Si | Mn | Al | N | Se | S | Others | | | | |
| 1 | 0.035 | 3.25 | 0.23 | 0.007 | 0.003 | — | — | — | 0.595 | 0.098 | Absence | Inventive Example |
| 2 | 0.044 | 3.06 | 0.03 | 0.007 | 0.003 | — | — | — | 0.100 | 0.102 | Absence | Inventive Example |
| 3 | 0.078 | 4.31 | 0.09 | 0.004 | 0.004 | — | — | — | 0.080 | 0.084 | Absence | Inventive Example |
| 4 | 0.065 | 3.50 | 0.08 | 0.035 | 0.008 | — | — | — | 0.088 | 0.096 | Absence | Inventive Example |
| 5 | 0.073 | 3.42 | 0.08 | 0.022 | 0.010 | 0.023 | — | — | 0.079 | 0.085 | Absence | Inventive Example |
| 6 | 0.058 | 3.25 | 0.06 | 0.023 | 0.008 | — | 0.025 | Nb: 0.009 | 0.081 | 0.082 | Absence | Inventive Example |
| 7 | 0.068 | 3.42 | 0.09 | 0.020 | 0.008 | 0.022 | — | B: 0.0023 | 0.101 | 0.110 | Absence | Inventive Example |
| 8 | 0.073 | 3.29 | 0.08 | 0.024 | 0.009 | 0.013 | — | Sb: 0.005, Te: 0.0095 | 0.107 | 0.108 | Absence | Inventive Example |
| 9 | 0.075 | 3.37 | 0.08 | 0.025 | 0.008 | 0.020 | — | Sb: 0.007, Cu: 0.01, P: 0.005 | 0.099 | 0.107 | Absence | Inventive Example |
| 10 | 0.071 | 3.31 | 0.07 | 0.021 | 0.007 | 0.025 | — | Ni: 0.015, Cr: 0.01, Sb: 0.180 | 0.133 | 0.135 | Absence | Inventive Example |
| 11 | 0.073 | 3.50 | 0.07 | 0.025 | 0.008 | 0.013 | — | B: 0.0018, Nb: 0.001 | 0.093 | 0.097 | Absence | Inventive Example |
| 12 | 0.067 | 3.23 | 0.10 | 0.025 | 0.004 | 0.023 | — | Sn: 0.006, V: 0.008 | 0.100 | 0.106 | Absence | Inventive Example |
| 13 | 0.067 | 3.25 | 0.08 | 0.040 | 0.011 | — | — | Ti: 0.008, Ta: 0.009 | 0.074 | 0.076 | Absence | Inventive Example |
| 14 | 0.035 | 3.31 | 0.03 | 0.013 | 0.008 | — | — | Bi: 0.005, Sn: 0.450 | 0.127 | 0.132 | Absence | Inventive Example |
| 15 | 0.073 | 3.18 | 0.08 | 0.027 | 0.007 | 0.023 | — | Bi: 0.090, Mo: 0.006, Ti: 0.002 | 0.104 | 0.111 | Absence | Inventive Example |
| 16 | 0.069 | 3.31 | 0.08 | 0.023 | 0.008 | 0.020 | 0.003 | Te: 0.0007, Nb: 0.008 | 0.092 | 0.095 | Absence | Inventive Example |
| 17 | 0.071 | 3.23 | 0.07 | 0.018 | 0.006 | 0.021 | — | V: 0.002, Ta: 0.002 | 0.092 | 0.096 | Absence | Inventive Example |
| 18 | 0.073 | 3.32 | 0.07 | 0.024 | 0.008 | 0.021 | — | P: 0.180, Mo: 0.070 | 0.107 | 0.112 | Absence | Inventive Example |
| 19 | 0.067 | 3.44 | 0.07 | 0.021 | 0.007 | 0.018 | — | Cu: 0.40, Cr: 0.38 | 0.084 | 0.088 | Absence | Inventive Example |
| 20 | 0.069 | 2.85 | 0.08 | 0.024 | 0.009 | 0.021 | — | B: 0.0004, Ni: 1.37 | 0.104 | 0.109 | Absence | Inventive Example |
| 21 | 0.071 | 3.23 | 0.07 | 0.018 | 0.006 | 0.021 | — | V: 0.002, Ta: 0.002 | 0.082 | 0.087 | Absence | Inventive Example |

TABLE 4-continued

| | Chemical composition (mass %) | | | | | | | Pickling weight loss (g/m²) | Concentration (mass %) of (Sn + Sb + Mo) on boundary face between film and iron matrix | Presence or absence of film stripping after magnetic domain subdividing treatment | Remarks |
|---|---|---|---|---|---|---|---|---|---|---|---|
| No | C | Si | Mn | Al | N | Se | S | Others | | | |
| 22 | 0.073 | 3.32 | 0.07 | 0.024 | 0.008 | 0.021 | — | P: 0.180, Mo: 0.070 | 0.111 | 0.117 | Absence | Inventive Example |
| 23 | 0.067 | 3.44 | 0.07 | 0.021 | 0.007 | 0.018 | — | Cu: 0.40, Cr: 0.38 | 0.088 | 0.093 | Absence | Inventive Example |
| 24 | 0.069 | 2.85 | 0.08 | 0.024 | 0.009 | 0.021 | — | B: 0.0004, Ni: 1.37 | 0.078 | 0.084 | Absence | Inventive Example |

Example 4

A steel slab having a component composition comprising C: 0.06 mass %, Si: 3.4 mass %, Mn: 0.08 mass %, Al: 0.025 mass %, N: 0.008 mass %, Se: 0.02 mass %, Sb: 0.05 mass % and the remainder being Fe and inevitable impurities is produced by a continuous casting method, heated to 1420° C., and hot-rolled to form a hot-rolled sheet having a sheet thickness of 2.5 mm. The hot-rolled sheet is then subjected to hot-band annealing at 1000° C. for 50 seconds, primary cold rolling to an intermediate sheet thickness of 1.5 mm, intermediate annealing at 1100° C. for 20 seconds, a secondary cold rolling to form a cold-rolled sheet having a final sheet thickness of 0.23 mm, and decarburization annealing combined with a primary recrystallization annealing. Note that the decarburization annealing is conducted at 840° C. for 100 seconds under a wet atmosphere of 50 vol % $H_2$-50 vol % $N_2$ having a dew point of 58° C.

A slurried annealing separator composed mainly of MgO and containing $MoO_3$ by 4 mass % as converted to Mo is applied to the steel sheet surface after the decarburization annealing and is dried. Then, the steel sheet is subjected to finish annealing comprised of retention treatment of holding the steel sheet at 920° C. for 40 hours under a dry $N_2$ atmosphere and purification treatment conducted at 1200° C. for 10 hours under an $H_2$ atmosphere. In the heating from 1050° C. to the purification treatment temperature (in the heating in the high-temperature zone), a dry gas containing 1 vol % $H_2$ and having a dew point of −5° C. as an atmospheric gas is introduced into the furnace, such that the pressure inside the furnace (furnace pressure) reaches two conditions, 1.5 mm$H_2$O and 6 mm$H_2$O.

Measurement is performed on the pickling weight loss (g/m²) and on the total concentration of Sb and Mo on the boundary face between the film and iron matrix of the steel sheet having a forsterite film after the finish annealing, as in Example 1. The measurement results are such that the pickling weight loss is 1.92 g/m² and 1.12 g/m² in the case of the furnace pressure of 1.5 mm$H_2$O and 6 mm$H_2$O, respectively, and the total concentration of Sb and Mo on the boundary face between the film and iron matrix is 0.008 mass % and 0.071 mass % in the case of the furnace pressure of 1.5 mm$H_2$O and 6 mm$H_2$O, respectively.

After removal of unreacted annealing separator, the steel sheet after the finish annealing is coated in an insulation coating, subjected to flattening annealing combined with baking and flattening treatment, and subjected to magnetic domain subdividing treatment by irradiating electron beams to the steel sheet surface at a current density varying within the range of 10 to 120 mA/mm² to produce a product sheet, on which whether film stripping is caused is examined as in Example 1 and of which iron loss $W_{17/50}$ is measured according to a measurement method of alternating-current magnetization properties of JIS C2550.

Figure 3A:
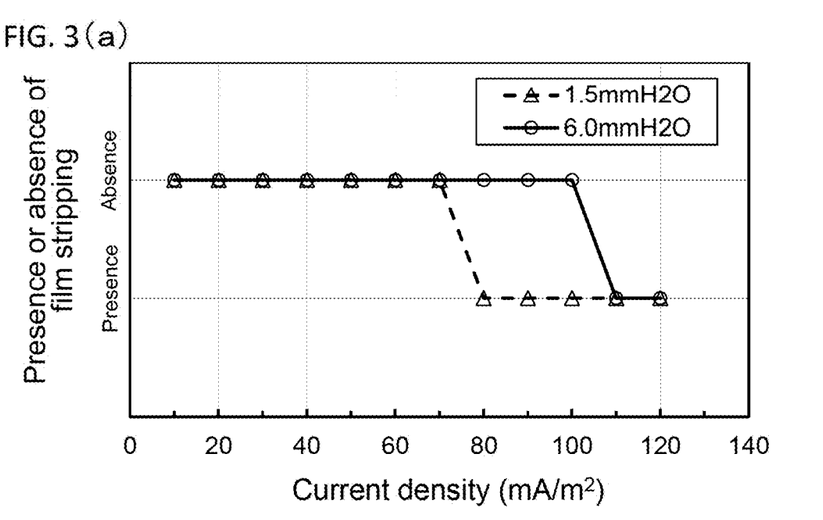
FIGS. 3(a) and 3(b) are graphs showing an influence of a furnace pressure of an atmospheric gas at heating in a high-temperature zone of finish annealing upon a relation of the current density of electron beam irradiation, stripping properties of the film, and iron loss.
Figure 3B:
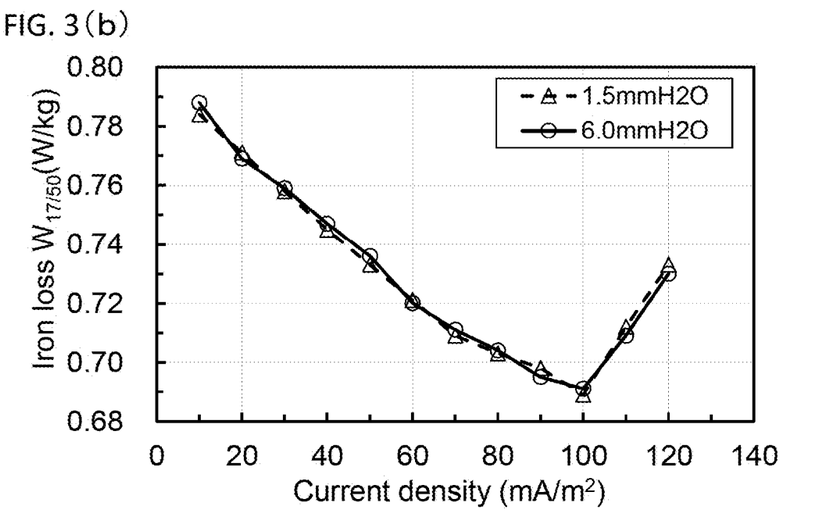

FIG. 3 shows the measurement result. As seen from the figure, the finish annealing conducted under conditions in conformity with the present invention maximizes the effect of reducing the iron loss by magnetic domain subdividing treatment without causing film stripping even when electron beams are irradiated at a high energy density.

Example 5

A raw steel material having the same component composition as in Example 4 is coated with an insulation coating on a forsterite film produced under the same conditions as in Example 4 and subjected to the flattening annealing to form a steel sheet. The steel sheet is subjected to magnetic domain subdividing treatment by irradiating laser beams at a power within the range of 60 to 120 W to produce a product sheet. Whether film stripping is caused on the product sheet is examined as in Example 1, and loss $W_{17/50}$ of the product sheet is measured according to a measurement method of alternating-current magnetization properties of JIS C2550.

Figure 4A:
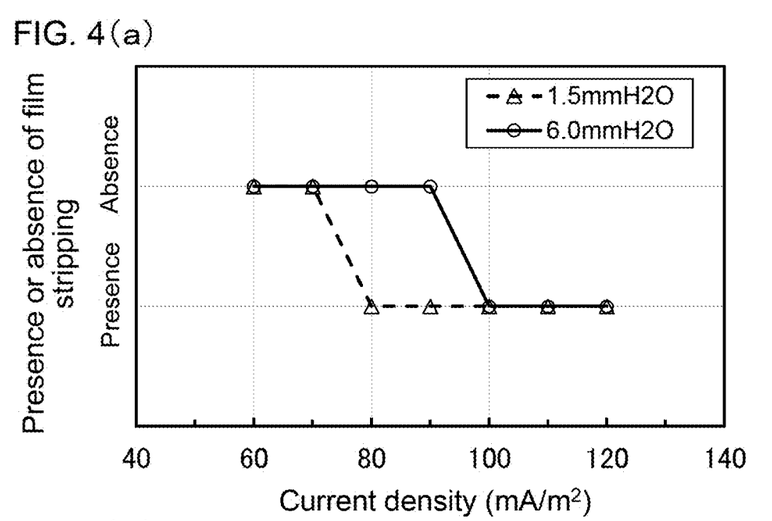
FIGS. 4(a) and 4(b) are different graphs showing an influence of a furnace pressure of an atmospheric gas at heating in a high-temperature zone of finish annealing upon a relation of the current density of electron beam irradiation, stripping properties of the film, and iron loss.
Figure 4B:
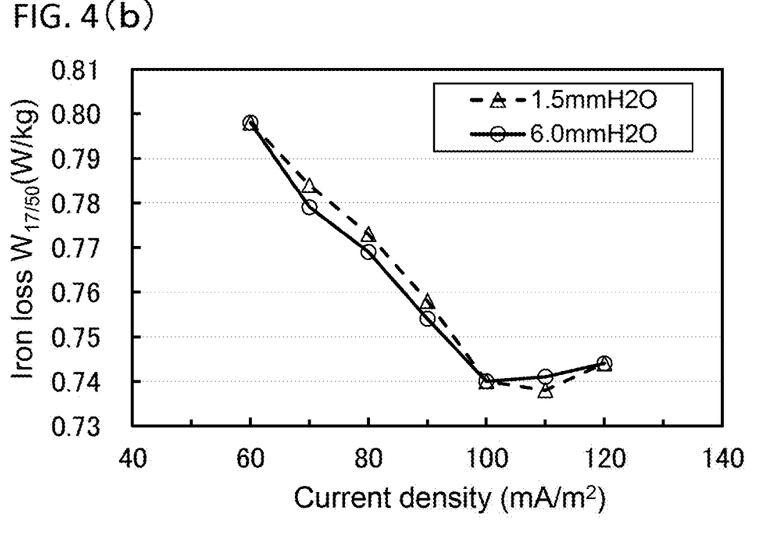

FIG. 4 shows the result of the above measurement. As seen from this figure, the finish annealing conducted under conditions in conformity with the present invention maximizes the effect of reducing the iron loss by magnetic domain subdividing treatment without causing film stripping even when electron beams are irradiated at a high energy density.

The invention claimed is:

1. A grain-oriented electrical steel sheet for magnetic domain subdividing treatment having a forsterite undercoat film,
   characterized in that
   a pickling weight loss caused by pickling the undercoat film with an aqueous solution of 5 mass % HCl at 60° C. for 60 seconds is not more than 1.8 g/m², and
   a total concentration of Sn, Sb, Mo, and W present on a boundary face between the undercoat film and iron matrix is 0.01 to 0.15 mass %.

2. The grain-oriented electrical steel sheet according to claim 1, wherein
   the grain-oriented electrical steel sheet has a component composition comprising C: not more than 0.0050 mass %, Si: 2.5 to 4.5 mass %, Mn: 0.03 to 0.30 mass %, and the remainder being Fe and inevitable impurities.

3. The grain-oriented electrical steel sheet according to claim 2, wherein
   the grain-oriented electrical steel sheet contains, in addition to the above component composition, one or two or more selected from Ni: 0.01 to 1.50 mass %, Cr: 0.01 to 0.50 mass %, Cu: 0.01 to 0.50 mass %, P: 0.005 to 0.20 mass %, Sn: 0.005 to 0.50 mass %, Sb: 0.005 to 0.20 mass %, Bi: 0.005 to 0.10 mass %, Mo: 0.005 to 0.10 mass %, B: 0.0002 to 0.0025 mass %, Te: 0.0005 to 0.010 mass %, Nb: 0.001 to 0.010 mass %, V: 0.001 to 0.010 mass %, W: 0.002 to 0.050 mass %, Ti: 0.001 to 0.010 mass % and Ta: 0.001 to 0.010 mass %.

4. The grain-oriented electrical steel sheet according to claim 1, wherein the total concentration of Sn, Sb, Mo, and W is higher on the boundary face than in the iron matrix.

5. A grain-oriented electrical steel sheet for magnetic domain subdividing treatment having a forsterite undercoat film,
characterized in that
a pickling weight loss caused by pickling the undercoat film with an aqueous solution of 5 mass % HCl at 60° C. for 60 seconds is not more than 1.8 g/m$^2$, and
a total concentration of Sn, Sb, Mo, and W present on a boundary face between the undercoat film and iron matrix is 0.01 to 0.15 mass %,
wherein an annealing separator applied to the grain-oriented steel sheet contains not less than 50 mass % MgO and at least one selected from Sn, Sb, Mo, and W compounds by 0.3 to 5 mass % as converted to a metal with respect to the annealing separator, such that the total concentration of Sn, Sb, Mo, and W present on the boundary face between the undercoat film and iron matrix is 0.01 to 0.15 mass %.

6. A method for producing the grain-oriented electrical steel sheet according to claim 1 comprising
hot rolling a raw steel material comprising C: 0.02 to 0.08 mass %, Si: 2.5 to 4.5 mass %, Mn: 0.03 to 0.30 mass % and the remainder being Fe and inevitable impurities to from a hot-rolled sheet,
subjecting the hot-rolled sheet to a single cold rolling or two or more cold rollings having an intermediate annealing between each cold rolling to form a cold-rolled sheet having a final sheet thickness,
subjecting the cold-rolled sheet to decarburization annealing combined with primary recrystallization,
applying an annealing separator containing not less than 50 mass % MgO onto the steel sheet surface,
subjecting the steel sheet to finish annealing,
applying an insulation film thereto followed by baking, and
subjecting the steel sheet to a magnetic domain subdividing treatment,
characterized in that
the annealing separator includes at least one selected from Sn, Sb, Mo, and W compounds by 0.3 to 5 mass % as converted to a metal with respect to the whole annealing separator, and
in the finish annealing comprising conducting retention treatment of holding the steel sheet at a temperature of not lower than 800° C. but not higher than 950° C. for not less than 10 hours but not more than 100 hours under an inert atmosphere and then conducting purification treatment at a temperature of not lower than 1150° C. but not higher than 1250° C., dry gas containing not less than 1 vol % H$_2$ and having a dew point of not higher than 10° C. is introduced as an atmospheric gas during the time the temperature is from not lower than 1050° C. to the purification treatment temperature so as to achieve a furnace pressure of not less than 3.5 mmH$_2$O.

7. The method for producing a grain-oriented electrical steel sheet 5, according to claim 4, wherein
the raw steel material contains, in addition to the above component composition, any one of the following inhibitor-forming ingredient groups of Groups A to C:
Group A: Al: 0.010 to 0.040 mass % and N: 0.003 to 0.012 mass %,
Group B: Se: 0.0030 to 0.030 mass % and/or S: 0.0040 to 0.030 mass %
Group C: Al: 0.010 to 0.040 mass %, N: 0.003 to 0.012 mass %, Se: 0.0030 to 0.030 mass % and/or S: 0.0040 to 0.030 mass %.

8. The method for producing a grain-oriented electrical steel sheet according to claim 4, wherein
contents of Al, N, S, and Se in the inevitable impurities in the raw steel material are Al: less than 0.01 mass %, N: less than 0.0050 mass %, S: less than 0.0040 mass %, and Se: less than 0.0030 mass %.

9. The method for producing a grain-oriented electrical steel sheet according to claim 4, wherein
the raw steel material contains, in addition to the above component composition, one or two or more selected from Ni: 0.01 to 1.50 mass %, Cr: 0.01 to 0.50 mass %, Cu: 0.01 to 0.50 mass %, P: 0.005 to 0.20 mass %, Sn: 0.005 to 0.50 mass %, Sb: 0.005 to 0.20 mass %, Bi: 0.005 to 0.10 mass %, Mo: 0.005 to 0.10 mass %, B: 0.0002 to 0.0025 mass %, Te: 0.0005 to 0.010 mass %, Nb: 0.001 to 0.010 mass %, V: 0.001 to 0.010 mass %, W: 0.002 to 0.050 mass %, Ti: 0.001 to 0.010 mass % and Ta: 0.001 to 0.010 mass %.

10. The method for producing a grain-oriented electrical steel sheet according to claim 5, wherein
the raw steel material contains, in addition to the above component composition, one or two or more selected from Ni: 0.01 to 1.50 mass %, Cr: 0.01 to 0.50 mass %, Cu: 0.01 to 0.50 mass %, P: 0.005 to 0.20 mass %, Sn: 0.005 to 0.50 mass %, Sb: 0.005 to 0.20 mass %, Bi: 0.005 to 0.10 mass %, Mo: 0.005 to 0.10 mass %, B: 0.0002 to 0.0025 mass %, Te: 0.0005 to 0.010 mass %, Nb: 0.001 to 0.010 mass %, V: 0.001 to 0.010 mass %, W: 0.002 to 0.050 mass %, Ti: 0.001 to 0.010 mass % and Ta: 0.001 to 0.010 mass %.

11. The method for producing a grain-oriented electrical steel sheet according to claim 6, wherein
the raw steel material contains, in addition to the above component composition, one or two or more selected from Ni: 0.01 to 1.50 mass %, Cr: 0.01 to 0.50 mass %, Cu: 0.01 to 0.50 mass %, P: 0.005 to 0.20 mass %, Sn: 0.005 to 0.50 mass %, Sb: 0.005 to 0.20 mass %, Bi: 0.005 to 0.10 mass %, Mo: 0.005 to 0.10 mass %, B: 0.0002 to 0.0025 mass %, Te: 0.0005 to 0.010 mass %, Nb: 0.001 to 0.010 mass %, V: 0.001 to 0.010 mass %, W: 0.002 to 0.050 mass %, Ti: 0.001 to 0.010 mass % and Ta: 0.001 to 0.010 mass %.

* * * * *

UNITED STATES PATENT AND TRADEMARK OFFICE
CERTIFICATE OF CORRECTION

PATENT NO. : 12,354,778 B2
APPLICATION NO. : 17/768570
DATED : July 8, 2025
INVENTOR(S) : Makoto Watanabe, Masahiro Suemune and Takeshi Imamura Page 1 of 1

It is certified that error appears in the above-identified patent and that said Letters Patent is hereby corrected as shown below:

In the Claims

In Column 24, Line 7 in Claim 7 the term "steel sheet 5, according to claim 4," should read -- steel sheet according to claim 6, --.

In Column 24, Line 20 in Claim 8 the word "claim 4," should read -- claim 6, --.

In Column 24, Line 21 in Claim 8 the word "AI," should read -- Al, --.

In Column 24, Line 25 in Claim 9 the word "claim 4," should read -- claim 6, --.

In Column 24, Line 38 in Claim 10 the word "claim 5," should read -- claim 7, --.

In Column 24, Line 50 in Claim 11 the word "claim 6," should read -- claim 8, --.

Signed and Sealed this
Twenty-first Day of October, 2025

John A. Squires
*Director of the United States Patent and Trademark Office*